J. BENSKIN.
STOVE TRUCK.
APPLICATION FILED SEPT. 25, 1911.

1,014,440.

Patented Jan. 9, 1912.

UNITED STATES PATENT OFFICE.

JOSEPH BENSKIN, OF MAHOMET, ILLINOIS, ASSIGNOR OF ONE-HALF TO ISAAC T. BRIDGES, OF MAHOMET, ILLINOIS.

STOVE-TRUCK.

1,014,440.
Specification of Letters Patent.
Patented Jan. 9, 1912.

Application filed September 25, 1911. Serial No. 651,265.

*To all whom it may concern:*

Be it known that I, JOSEPH BENSKIN, a citizen of the United States, residing at Mahomet, in the county of Champaign and State of Illinois, have invented certain new and useful Improvements in Stove-Trucks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in trucks for moving stoves and other heavy objects and consists of a simple device of this nature having various details of construction and combinations and arrangements of parts which will be hereinafter fully described, shown in the accompanying drawings and then specifically defined in the appended claim.

I illustrate my invention in the accompanying drawings, in which:—

Figure 1:
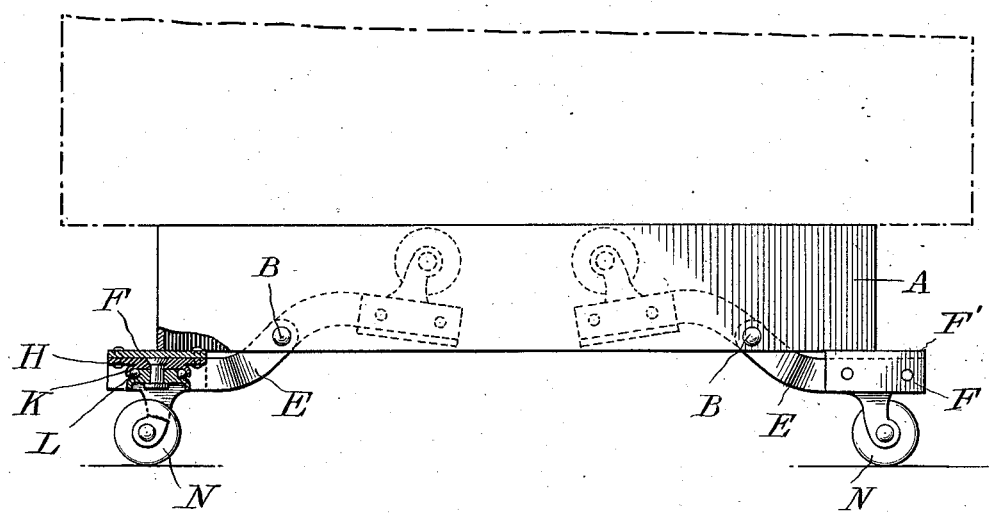
Figure 2:
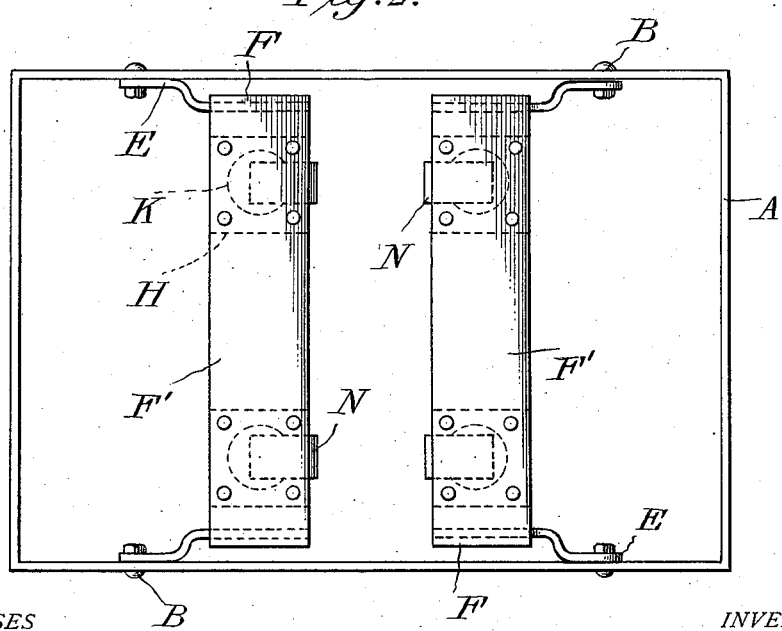

Figure 1 is a side elevation showing the device adjusted for use, the frames carrying the rollers being shown in dotted lines in folded position, and Fig. 2 is a bottom plan view.

Reference now being had to the details of the drawings by letter, A designates a truck frame made preferably of metal and of any shape, preferably rectangular. Pivotal screws B project from the opposite sides and bracket arms E are pivotally mounted, one upon each of said screws, each bracket arm preferably having an angled part which is fastened rigidly to the angled end F of a bar F'. Fastened to each of said bars is a plate H having a cup-shaped member K adapted to hold ball bearings L, and N is a caster which is swiveled to said plate and is adapted to bear against the anti-friction balls. It will be noted upon reference to the side view of the drawings that the bracket members are slightly angled longitudinally so that, when the device is adjusted for use, the face of each bar will bear against the under edge of the bottom of the frame or truck.

In adjusting the device for use, the bracket members are swung to the position shown in solid lines in Fig. 1. When not in use, they fold to the position shown in dotted lines in which the bracket arms and the casters will be contained within the opposite walls of the truck and out of the way.

What I claim to be new is:—

A device for moving stoves, etc., consisting of a hollow frame, curved legs pivoted to the inner faces of said frame, plates fastened to the corresponding edges of said legs, at their outer ends, and adapted to swing underneath the opposite ends of the frame, and form a support therefor, caster wheels swivelly mounted one underneath each of said plates, and fastened thereto, as shown and described.

In testimony whereof I hereunto affix my signature in the presence of two witnesses.

JOSEPH BENSKIN.

Witnesses:
R. G. JOHNSTON,
JOSEPH SYLVESTER.

Copies of this patent may be obtained for five cents each, by addressing the "Commissioner of Patents, Washington, D. C."